I. G. BURTON.
EYEGLASS PROTECTOR.
APPLICATION FILED DEC. 30, 1913.
1,143,502.
Patented June 15, 1915.
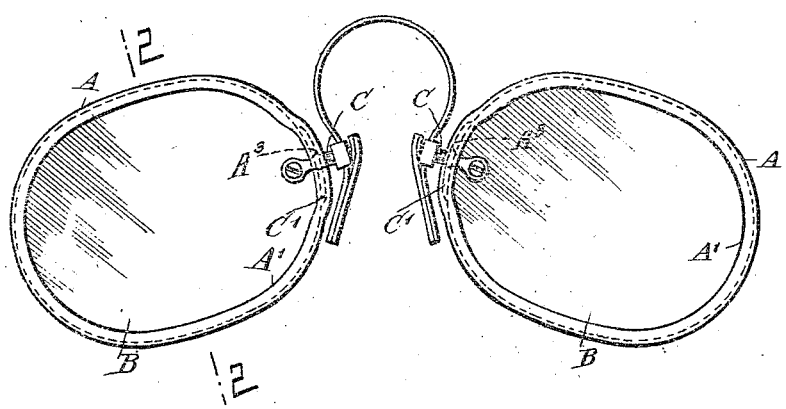
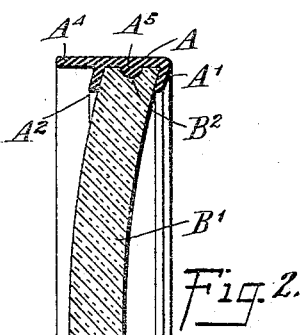
WITNESSES:
George L. Blume.
INVENTOR
Irwin G. Burton
BY
ATTORNEYS

UNITED STATES PATENT OFFICE.

IRWIN G. BURTON, OF ASBURY PARK, NEW JERSEY.

EYEGLASS-PROTECTOR.

1,143,502.　　　　Specification of Letters Patent.　　Patented June 15, 1915.

Application filed December 30, 1913. Serial No. 309,471.

*To all whom it may concern:*

Be it known that I, IRWIN G. BURTON, a citizen of the United States, and a resident of Asbury Park, in the county of Monmouth and State of New Jersey, have invented a new and Improved Eyeglass-Protector, of which the following is a full, clear, and exact description.

The object of the invention is to provide a new and improved eyeglass protector arranged for convenient attachment to the rims of the eyeglass lenses with a view to protect the lenses against breaking or cracking in case the user accidentally drops the eyeglass.

In order to accomplish the desired result use is made of a ring of rubber or similar elastic material encircling the rim of the lens and projecting beyond the faces of the lens.

A practical embodiment of the invention is represented in the accompanying drawings forming a part of this specification, in which similar characters of reference indicate corresponding parts in all the views.

Figure 1 is a face view of a pair of eyeglasses provided with the protector; and Fig. 2 is an enlarged cross section of the protector as applied to a convex lens.

The eyeglass protector consists of a ring A, of rubber or other similar elastic material, adapted to encircle the rim of each lens B of a pair of eyeglasses. The ring A, as shown in the drawings is provided with integral inwardly-extending flanges A', A² overlying the faces of the lens B adjacent the rim thereof, as plainly indicated in Figs. 1 and 2. The ring A is provided with an aperture A³ for the passage of the post C of the eyeglass frame of usual construction, and the ring A also overlies the ears C' held on the post C and engaging the rim of the corresponding lens B, as indicated in Fig. 1. In practice, the ring A is less in size than the rim of the lens B and in placing the ring A in position on the rim of the lens B, it is necessary to stretch the ring A so that the latter fits snugly on the rim of the lens B and is thus securely held in place on the lens. By the post C passing through the opening A³ the ring A is held against creeping on the rim of the lens B, and by the ring A overlying the ears C' the latter are firmly held in contact with the rim of the lens thus preventing the frame from becoming loose on the lens B.

It is understood that the eyeglasses in accidentally dropping are protected by the ring A and its flanges A' and A², as the said parts cushion the lenses in striking on the floor and hence the lenses are not liable to be broken or cracked on accidentally dropping the eyeglasses.

It will also be noticed that the flanges A' and A² besides forming protecting means for the faces of the lens prevent the ring A from shifting laterally on the lens. It is understood that the flanges A' and A² form projections on the sides of the ring A and extend beyond the edges of the lens B especially if the lens B has its two faces concave. If, however, the lens has a convex outer face, as shown in Fig. 2, the ring is provided with an integral extension A⁴ at the flange A², so that the outer edge of the extension A⁴ is beyond the point of the curvature of the outer face of the lens B', so that in case the eyeglasses fall flat onto the floor the extension A⁴ protects the lens against breaking.

If desired, the rim of the lens B' may be provided with an annular recess B² into which projects a bead A⁵ formed on the inner face of the ring A to securely hold the latter in position on the lens B'.

Having thus described my invention, I claim as new and desire to secure by Letters Patent:

1. A protector for the lenses of eyeglasses, comprising a ring of an elastic material, less in size than the rim of a lens and having a smooth unobstructed peripheral surface, the ring being adapted to encircle the rim and to be held in stretched condition thereon, the said ring projecting at the sides beyond the edges of the lens and having integral flanges extending inwardly on the ring and engaging the faces of the lens adjacent the rim, the said ring being provided with an aperture located between the flanges for the passage of the post of the eyeglass frame, the said ring also overlying the ears held on the post.

2. The combination with a pair of eyeglasses having lenses and a frame, of a protecting ring for the rim of each of the said lenses, the said ring being of an elastic material less in size than the said rim to hold the ring in stretched condition on the said rim of the lens, the said ring overlying the ears of the lens frame, the said ring having integral inwardly-extending flanges overlying the faces of the lens adjacent the rim, the said ring projecting at its sides beyond the edges of the lens and the said ring having an aperture for the passage of the post of the lens frame, the lens having an annular recess at its rim and the ring having an integral bead engaging the said recess.

3. The combination with an eyeglass lens having an annular recess at its rim, of a protecting ring for the rim of said lens, the ring being of an elastic material adapted to encircle the rim and having inwardly extending flanges overlying the faces of the lens adjacent the rim, and an annular bead on said ring engaging the said annular recess.

4. The combination with a pair of eyeglasses having lenses and a frame, of a protecting ring for the rim of each of the said lenses, the said ring being of an elastic material adapted to encircle the rim and projecting at the sides beyond the edges of the lens, the said ring having integral inwardly extending flanges overlying the faces of the lens adjacent the rim, the said lens having an annular recess at its rim, and the said ring having an integral bead engaging the said annular recess.

In testimony whereof I have signed my name to this specification in the presence of two subscribing witnesses.

IRWIN G. BURTON.

Witnesses:
   THEO. G. HOSTER,
   PHILIP D. ROLLHAUS